United States Patent [19]

Rhyner

[11] Patent Number: 4,534,007

[45] Date of Patent: Aug. 6, 1985

[54] DISPLACEMENT DETECTING SYSTEM IN A MULTI-AXIS MEASURING SYSTEM, ESPECIALLY FOR USE WITH A GEAR WHEEL GRINDING OR INSPECTING MACHINE

[75] Inventor: Hans-Ulrich Rhyner, Dübendorf, Switzerland

[73] Assignee: Maag Gear-Wheel & Machine Co., Ltd., Zurich, Switzerland

[21] Appl. No.: 473,091

[22] Filed: Mar. 7, 1983

[30] Foreign Application Priority Data

Mar. 15, 1982 [CH] Switzerland ............... 1605/82

[51] Int. Cl.³ .................. G06F 15/46; G05B 19/28
[52] U.S. Cl. .................... 364/560; 33/1 M; 33/179.5 R
[58] Field of Search ............ 364/561, 560, 550, 552, 364/474; 33/179.5 R, 179.5 D, 1 M

[56] References Cited

U.S. PATENT DOCUMENTS

| 4,026,031 | 5/1977 | Siddall et al. | 364/560 X |
| 4,036,607 | 7/1977 | Freddi | 364/560 X |
| 4,356,556 | 10/1982 | Sterki | 364/560 |
| 4,365,301 | 12/1982 | Arnold et al. | 364/560 X |
| 4,401,930 | 8/1983 | Kato et al. | 364/474 X |
| 4,415,967 | 11/1983 | Russell | 364/474 X |
| 4,484,293 | 11/1984 | Minucciani et al. | 364/560 X |
| 4,490,946 | 1/1985 | Tsujiuchi et al. | 364/474 X |
| 4,499,546 | 2/1985 | Kuga et al. | 364/474 |

Primary Examiner—Edward J. Wise
Attorney, Agent, or Firm—Werner W. Kleeman

[57] ABSTRACT

A displacement detector especially intended for a gear wheel grinding or inspecting machine contains a conventional pre-stage comprising a forward-backward counter receiving measuring pulses, a buffer or intermediate store for preserving the counter state at each moment, and a comparator for detecting predetermined position values during a measuring operation. To prevent overflow of the counter during more extended travel paths and at high resolution a pulse storing and detecting circuit and a synchronizer circuit are provided which enable the counter to be reset at any moment without any pulse becoming lost. Consequently, a conventional 8-bit or 16-bit microprocessor system and circuit components or elements of the same bit format can be used. The use of a 32-bit format is thus avoided, which otherwise requires substantially higher expense in terms of hardware, space and circuitry and which otherwise unavoidably must be used for more extended travel paths and high resolution.

3 Claims, 5 Drawing Figures

DISPLACEMENT DETECTING SYSTEM IN A MULTI-AXIS MEASURING SYSTEM, ESPECIALLY FOR USE WITH A GEAR WHEEL GRINDING OR INSPECTING MACHINE

BACKGROUND OF THE INVENTION

The present invention relates to a new and improved displacement detecting arrangement or system in a multi-axis measuring system containing measuring carriages, respectively displaceable along a leading axis and other axes for generating measuring pulses, especially for use with a gear wheel grinding or inspecting or testing machine.

In its more specific aspects, the present invention relates to a new and improved displacement detecting system in such a multi-axis measuring system which includes a primary or main computer for storing predetermined restarting or support points located on the leading axis, a comparator for supplying a measurement triggering or initiating signal to detect the then prevailing respective actual displacement position of a measuring carriage displaced along at least one other axis when one of the restarting points is passed, and a counter whose counted value at the moment when the measurement triggering or initiating signal occurs, is stored in a buffer or intermediate store for.

Displacement detecting arrangements or systems of such kind are used for measuring and positioning purposes in a number of axes, for example, in a gear wheel grinding or testing or inspecting machine. Conventionally one of the axes is selected as a guide or leading axis, which is represented in FIG. 1 as the Y-axis. In case of a particular measuring task, firstly desired reference or set points on the leading axis, so called support or re-starting points, are selected or computed. When the measuring carriage to which, in the case of a gear wheel testing or inspecting machine, a sensor is mounted, is advanced along the leading axis, the positions along the other axes are each measured at the moment when the restarting points are passed. Upon passing through the restarting or support points the corresponding values measured along the other axes are determined and also stored. From a comparison of the values associated with the restarting points with the measured values there then result corresponding deviation values, for example, relative to a theoretical involute profile. The measurement time, i.e. the moment of time at which one restarting or support point is crossed, is determined each time by the comparator which initiates measurements along the other axes by means of the measurement triggering or initiating signal.

Incremental scales of high resolution are used in such displacement detecting arrangements or systems, for example, one pulse for one micrometer ($\mu m$). When the computer and the counter are organized in a 16-bit format, an amount of data or information can be represented by $2^{16} \cong 64,000$ pulses at the maximum. At a resolution of 1 $\mu m$ this will result in a representable travel path of about 64 mm since otherwise the counter would overflow. If more extended travel paths are processed, there would only remain the possibility of selecting the counter size so large as to correspond to the most extended travel path. This cannot be realized at acceptable costs with travel paths in the order of magnitude of 2 to 3 meters. Additionally, continuously increasing resolutions are presently required, which aggravate the problems in combination with more extended travel paths. Gear wheel grinding and inspecting machines presently are operated, for example, at resolutions in the range of 0.5 to 0.1 $\mu m$, so that the representable travel path is still further reduced. Thus, with an increase in the resolution from 1 $\mu m$ to 0.5 $\mu m$ only a travel path of 32 mm can be represented with the aforementioned example. For this reason the hardware is required to have a very large bit format, for example 32-bits, by means of which then several meters of travel path can be readily represented, since $2^{32}$ pulses can be processed. A solution of the problem with 32-bit format hardware comprising a counter, a comparator and a buffer or intermediate store (latch) would hardly present any problems with respect to precision and time-delay. However, the expense would become too great in terms of space and circuit components. It would thus be of substantial advantage to find a possibility for effectively using presently conventional microprocessors which usually are organized in an 8-bit or 16-bit format and which could take over part of the task.

It is also conventional practice today to use a computer for calculating positional errors. The computer and the displacement detecting system are placed on different printed-circuit boards or cards which are then interconnected by corresponding buses. This is disadvantageous because additional buses result in specific expenses, for example, with respect to the bus driver, the bus reliability and so forth. It would therefore be particularly advantageous in terms of space requirments and circuitry expense if the entire arrangement for one channel could be based on one printed-circuit board. Due to such autonomous design the processing rate also could be correspondingly increased, because a reduction can be achieved in the amount of data for the common bus and because the synchronization problem would be minimized.

Finally, a further problem results with respect to the recognition of restarting or support point values in such displacement detecting systems in that the occurrence of any time delays must be avoided at any rate at very high resolutions, so that no measuring pulses are lost which otherwise would result in measurement errors. In combination with high operating speeds the high resolution results in input frequencies at the displacement detecting arrangement or system which is in the MHz-range. Up to now, there does not exist any conventional microprocessor capable of handling such high pulse frequencies and operating at a high enough speed which is sufficient to carry out the aforementioned comparison between the restarting point values and the measured values without any errors occurring in that comparison. For this reason, presently a microprocessor computer or microprocessor has only been used as a storing means or store and not as a comparator. This problem, therefore, could only be eliminated by an increase in the operating speed of the microprocessor system or unit.

SUMMARY OF THE INVENTION

Therefore, with the foregoing in mind it is a primary object of the present invention to provide a new and improved displacement detecting arrangement system in a multi-axis measuring system constructed in such a way as to be more compact even for the highest measurement value resolution.

Another important object of the present invention is directed to the provision of a new and improved displacement detecting system in a multi-axis measuring system which is operating autonomously.

Still a further significant object of the present invention is directed to a new and improved construction of a displacement detecting system in a multi-axis measuring system which is adapted to the possibilities offered by conventional microprocessor techniques.

Now in order to implement these and still further objects of the invention, which will become more readily apparent as the description proceeds, the displacement detecting arrangement or system of the present development is manifested by the features that, a number of channels each associated with one of said axes is provided, each of said channels comprising a displacement detector containing a counter bus connecting the counter output to the comparator and the buffer or intermediate store. There is also provided a microprocessor unit or system including a microprocessor to which the buffer or intermediate store is connected and which, in turn, is connected to the comparator. A synchronizer circuit is connected to control outputs of the microprocessor unit or system and itself is provided with synchronizer control outputs connected to the counter, the buffer store and the microprocessor system, respectively, in order to block the counter each time prior to reaching the counter overflow value, to transfer the content of the buffer or intermediate store which contains the content of the counter into the microprocessor system, and to reset and re-activate the counter until the counted value resulting prior to one of the restarting or support points does not amount to the overflow value and until the comparator, which has received the counted value remaining up to the restarting or support point and lying within the bit capacity of the comparator, delivers the measurement triggering or initiating signal when the remaining count conforms with the latest count counted by the counter, and the output of the comparator is connected to the channel input or inputs of the other axis or axes.

The solution of the problem is based upon the concept of avoiding the hardware expense for a 32-bit displacement detecting system otherwise required due to high resolution and extended travel path by using a conventional microprocessor system without losing properties like a high pulse counting frequency and a precise displacement determination. This is made possible by the recognition that in such a displacement detecting system the operational steps critical in terms of time predominantly occur at the region of lower-valued bits, so that the tasks of the higher-valued bits can be assumed by a microprocessor system. The rapid events corresponding to the lower-valued bits are detected by a preceding stage or pre-stage designed according to the invention and comprises the counter, the comparator and the buffer or intermediate store which are augmented by the synchronizer circuit. By means of the microprocessor system a bit-window corresponding to the bit format of the components in the displacement detecting system is shifted through the entire measuring range in such a manner that the counting capacity of the counter is not exceeded in the respective bit-window prior to when the restarting or support point is reached during which a measurement is triggered or initiated. According to the invention this is enabled by the counted value of the counter being stored in the buffer store during the movement along the leading axis and by subsequently resetting or extinguishing the counter without losing a measuring pulse. The actual positional value, then, is always composed of a controlled stored value and the momentarily counted value which was last present in the counter prior to reaching the restarting point. The overflow of the counter is avoided because the counter repeatedly is reset at an optional moment of time before the counter overflow value thereof is reached and without a pulse being lost. This is enabled by the buffer or intermediate store and the synchronizer circuit which control the operations in the pre-stage which are critical in terms of time.

To better clarify the advantage of using a conventional microprocessor system in the displacement detecting arrangement or system according to the nvention, the microprocessor system or unit is assumed to have a 16-bit format. It may further be assumed that a measurement has to be accomplished at a restarting or support point, the value of which corresponds to 158,000 pulses and which is stored in the microprocessor system. The counter receives measuring pulses via the pulse input of the arrangement and counts such measuring pulses. Prior to the point of overflow, which may be a value of 64,000 pulses in a 16-bit counter, the counter is stopped by the microprocessor system via the synchronizer circuit and, then, is reset. The contents of the buffer or intermediate which also contains this counted value is taken-over into the microprocessor system. Since the difference between 64,000 and 158,000 is still greater than the maximum capacity of a 16-bit comparator, the comparator is not yet activated. Moreover, the counter is re-activated and again counts 64,000 pulses which are transferred to the microprocessor system which now contains 128,000 pulses. The microprocessor system, in which the restarting point is also stored, now delivers the remaining or residual difference value of 30,000 pulses to the comparator causing the same to monitor the state of the counter from this point on. At the moment when the counter has reached the state corresponding to 30,000 pulses, the measurement triggering or initiating signal is delivered by the comparator by means of which the measuring operation is initiated in the other channels. In this case the displacement detecting system operates by using a 16-bit window which is shifted along the travel path until a counted value occurs at the counter which is within the range of the capacity of the hardware-counter and the hardware-comparator.

Due to using a bit-window which is shifted through the range of travel, the displacement detecting system requires very little space, so that the displacement detecting system associated with one measuring channel can be accommodated as a compact unit including the microprocessing system or unit upon a single printed-circuit board or card. Additionally, the displacement detecting system according to the invention is autonomous because all the functional units are contained in the same printed-circuit board, so that any bus connections which decrease s the operational speed and leading to functional units associated with the same measuring channel and accommodated on other printed-circuit boards can be dispensed with.

When using the displacement detecting system according to the invention, where only distinct restarting or support point values have to be recognized, the microprocessor system or unit calculates the difference between each respective positional value and the counted value and loads the difference into the comparator when this difference is within the capacity range of the pre-stage of, for example, 8-bits or 16-bits. When the measuring points which are within the range of operation of the comparator are equidistant, the comparator need only be loaded once, since the counter is reset at each measuring point.

In a further design of the displcement detecting system according to the invention a pulse storing and detecting means or detector is arranged intermediate the counter and the channel input. The pulse storing and detecting means is activatable via a further control output of the synchronizer circuit at the moment when the counter is reset. A control output of the pulse storing and detecting means is connected to the synchronizer circuit to activate the same each time a measuring pulse occurs.

With such system design the counter can be reset at any moment of time without one measuring pulse getting lost. Therefore, the combined pulse storing and detecting means is connected forwardly of that the counter. At the moment of time the counter is reset, the combined pulse storing and detecting means is activated by a blocking signal derived from the synchronizer circuit which additionally interrupts the input to the counter. The counter is, then, reset by a reset signal derived from the synchronizer circuit. The combined pulse storing and detecting means are activated only when the counter is to be reset, whereas otherwise the pulses simply pass through the same. When a measuring pulse occurs during the activation period of the combined pulse storing and detecting means the latter will deliver a pulse-recognized signal to the synchronizer circuit which temporarily stores the pulse in an event-storage means and then causes the buffer store, via a data-laden-connection, to take-over the recognized pulse which is also present in the counter. However, this transfer will occur only when the value which was previously present in the buffer store has been taken-over by the microprocessor system or unit. In this manner all pulse events occurring within the reset phase are registered by the counter.

A further development of the displacement detecting system according to the invention is related to a measuring system comprising three axes. In such a triaxial measuring system the displacement detector associated with the axis selected as the leading axis controls the two other displacement detectors associated with the other axes. Such a simple control design may be correspondingly extended to any desired number of measuring system axes.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
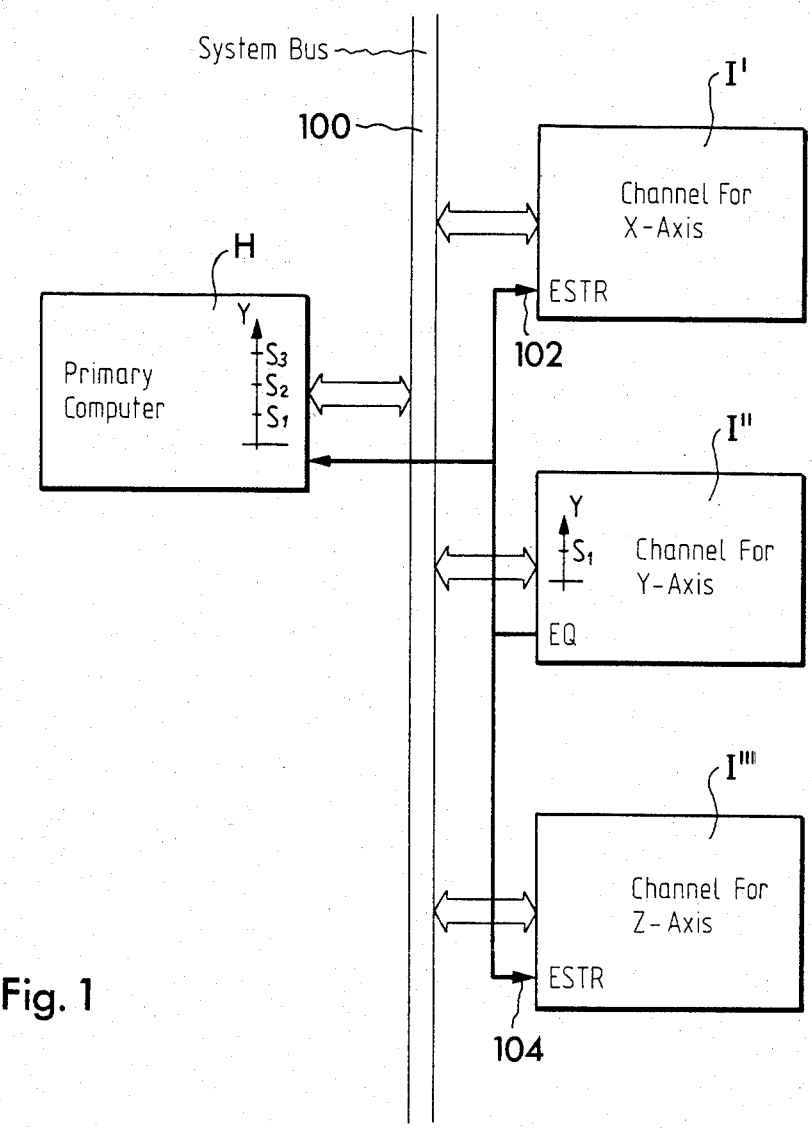
FIG. 1 shows a block circuit diagram of a triaxial measuring system including a displacement detecting system constructed according to the invention for each channel associated with a respective axis.

Describing now the drawings, it is to be understood that only enough of the circuit components and circuitry have been conveniently shown as needed for the those skilled in the art to readily understand the underlying principles and concepts of the present development, while simplifying the showing of the drawings. Turning attention now specifically to FIG. 1, there has been schematically shown therein a block circuit diagram of a triaxial measuring system, for example, of a gear wheel grinding or inspecting machine. The exemplary depicted displacement detecting system or arrangement comprises three channels, each of which is associated with a respective axis and comprises a related displacement detector of the type described in greater detail hereinafter. A primary or main computer H is connected by a system bus 100 to the displacement detectors I', I'' and I''', associated with the X-axis, the Y-axis and the Z-axis, respectively. Each of the three displacement detectors I', I'' and I''' includes an output for a measurement triggering or initiating signal and an input for an externally generated gating signal. In the exemplary embodiment illustrated in FIG. 1, the primary computer H has selected the Y-axis as the leading axis as already briefly explained initially. Therefore, the primary or main computer H contains a number of restarting or support points $S_1$, $S_2$, $S_3$ at the Y-axis for a particular measuring task, as shown symbolically in FIG. 1. As a leading axis that axis is selected where the restarting points $S_1$, $S_2$, $S_3$ are widely spaced, i.e. the axis which will most readily cause the counter to overflow. The displacement detector I'' corresponding to this axis will then controls the other two displacement detectors I' and I''', which are subordinate thereto. The output EQ (equal) for the measurement initiating signal of the displacement detector I' is connected to an input 102 of the primary computer H and to a respective input 102 and 104 for the externally generated gating signal ESTR (extern strobe) provided for each one of the other two displacement detectors I' and I'''. The first restarting or support point $S_1$ is inputted by the primary computer H into the displacement detector I'', as shown symbolically in FIG. 1, and the measuring operation can start. During the travel of the conventional measuring carriage (not shown) along the leading axis, the restarting point $S_1$ is traversed and during traversal thereof the displacement detector I'' of the channel associated with the Y-axis, which it will be recalled is the leading axis, delivers a measurement triggering or initiating signal EQ to the remaining two displacement detectors I' and I''', in order to thus initiate the measuring operation on the X-axis and Z-axis, respectively. Simultaneously, there is reported to the primary computer H by the measurement initiating signal EQ that the first restarting point $S_1$ has been worked-off or processed. Then, the primary computer H will enter the next following restarting point $S_2$ into the displacement detector I'', and the measuring operation is accomplished as described hereinbefore. The measurement triggering or initiating signal EQ forms the externally derived gating signal ESTR for the displacement detectors I' and I''', by means of which the synchronizer circuit is controlled and which will be described in greater detail hereinafter.

Figure 2:
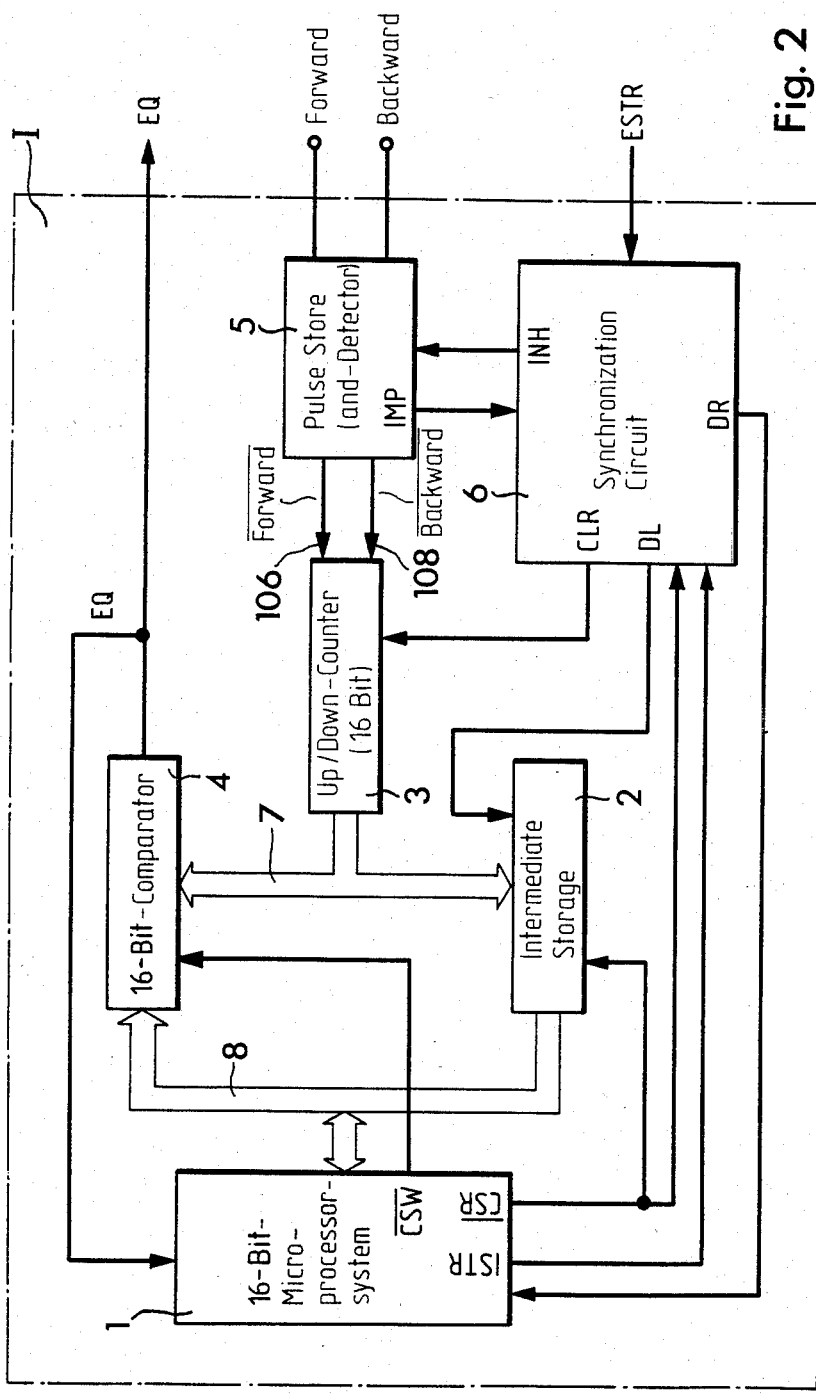
FIG. 2 is a block circuit diagram of a displacement detector of the displacement detecting system shown in FIG. 1.

FIG. 2 shows a displacement detector designated by reference character I which can be used in the displacement detecting arrangement or system illustrated in FIG. 1 and which is shown, merely by way of example, as organized in a 16-bit-format. The displacement detector I receives measuring pulses originating from a suitable measuring system (not shown) which form input signals at input terminals designated by FORWARD and BACKWARD, respectively. Due to the incremental scale of the measuring system forwardly directed measuring pulses are delivered to the FORWARD-input in one axial direction and backwardly directed measuring pulses are delivered to the BACKWARD-input in the other axial direction when the measuring carriage travels along the leading axis. Consequently, the displacement detector I is supplied with measuring pulses of the correct sign. The aforementioned two inputs are connected to a combined pulse storing and detecting unit or circuit 5 which has outputs designated by $\overline{\text{FORWARD}}$ and $\overline{\text{BACKWARD}}$ which are connected to corresponding inputs 106 and 108 of a counter 3 which is a 16-bit forward-backward counter. By means of a counter bus 7 the counter 3 is connected to a 16-bit-comparator 4 and to a buffer or intermediate store 2. By means of a microprocessor bus 8 the buffer or intermediate store 2 is connected to a 16-bit microprocessor system or unit 1. The microprocessor system 1 may communicate with the comparator 4 via the microprocessor bus 8. Therefore, the portion of the microprocessor bus 8 directed into the microprocessor system or unit 1 is shown as a bidirectional bus.

The displacement detector I furthermore contains various controlling connections, the function of which will be explained hereinafter in conjunction with the description of the mode of operation of the displacement detector I.

The measuring pulses represent displacement pulses which in the case of a gear wheel testing or inspecting machine are supplied by a suitable position measuring sensor or feeler. The measuring pulses are delivered with their correct sign to the combined pulse storing and detecting means 5, i.e. to the one or the other input thereof. As long as the counter 3 just counts the measuring pulses the same will pass through the combined pulse storing and detecting means 5 just as if the same were not present. Only when the counter 3 is reset will the combined pulse storing and detecting means 5 be activated as described in detail further below. The pulses passing through the combined pulse storing and detecting means 5 are counted in the counter 3. The respective counting result is continuously stored in the buffer or intermediate store 2. At the same time the counting result is compared with restarting points in the comparator 4 and which have been stored in the microprocessor system 1 prior to the start of the measuring operation. The microprocessor system or unit 1 supplies the desired reference or set value, corresponding to the first restarting point, to the comparator 4 which compares the same with the actual value as measured on the leading axis, which actual value is delivered to the displacement detector I through the FORWARD- and BACKWARD-inputs. When the set or reference value conforms with the actual value, i.e. when the restarting or support point on the leading axis is crossed by the measuring carriage carrying the sensor, then the comparator 4 delivers a measurement triggering or initiating signal EQ, which forms an externally generated gating signal ESTR, to the channels I' and I''' shown in FIG. 1 which then initiates the measurement along the X- and Z-axes. Consequently, the synchronizer circuits also present in the respective channels are triggered which then control the buffer stores, so that the content thereof is transferred by the microprocessor system. The store or storage contents, then, represent the sought measuring value which corresponds to the re-starting point $S_1$ on the leading axis as shown in FIG. 1. In the present case the displacement detector I would operate correctly in the manner as described provided that the resolution and the travel path are small enough, so that the counter capacity of about 64,000 pulses is not exceeded. To preclude counter overflow the pre-stage, according to the invention which essentially comprises the counter 3, the buffer or intermediate store 2 and the comparator 4 are designed such that the counter 3 is prevented from overflowing when the number of pulses exceeds 64,000. Therefore, the pre-stage further includes the combined pulse storing and detecting means 5 and the synchronizer circuit 6 which enable the counter 3 to be reset prior to each respective overflow without any loss of any measuring pulses.

As explained above, the contents of the counter 3 are continuously stored in the buffer store 2 which therefore always contains a precise image or duplication of the contents of the counter 3. All measuring pulses received by the counter 3 by the combined pulse storing and detecting means 5 are simultaneously supplied by the counter 3 to the buffer store 2, in order to provide in the same the actual counter content at any time. When the contents of the counter 3 approaches the overflow value the microprocessor system 1 feeds an internally generated gating pulse ISTR (intern strobe) to the synchronizer circuit 6. At this moment the contents of the counter 3 as present in the buffer store 2, must be transferred into the microprocessor system 1. Therefore, the synchronizer circuit 6 firstly activates the combined pulse storing and detecting means 5 by delivering a blocking signal INH (inhibit) to the same. The synchronizer circuit 6 then blocks the buffer store 2 by means of signal DL and finally resets the counter 3 by a clearing signal CLR and blocks the contents of the buffer store 2. When the signal DL is fed to the buffer store 2 a data-ready signal DR is supplied after a certain time-delay by the synchronizer circuit 6 to the microprocessor system or unit 1 to inform the same that the data is prepared to be taken-over from the buffer store 2. A read signal $\overline{\text{CSR}}$ (chip select read) is supplied to the synchronizer circuit 6 to reset the same to the original state so that the operation may start anew.

For better understanding the mode of operation of the displacement detector I, the initially mentioned example will be described in somewhat still greater detail. It has been assumed in the example, that a pulse number or count of 158,000 has been stored in the microprocessor system 1 for the first restarting or support point $S_1$. Prior to the first overflow of the counter 3 and during take-over of the contents of the buffer or intermediate store 2 the microprocessor system or unit 1 determines that 64,000 pulses have been counted. Since the difference between 64,000 and 158,000 pulses is still larger than the bit capacity of the comparator 4 which amounts to 64,000 bits, the counted value of 64,000 is stored in the microprocessor system 1, but not yet transferred to the comparator 4. When the overflow value is reached again, i.e. when again 64,000 pulses have been taken-over by the microprocessor system 1 from the buffer store 2, these 64,000 pulses are added in the microprocessor system 1 to the preceding 64,000 pulses, which results in 128,000 pulses. The microprocessor system or unit 1 now determines that the difference to 158,000 only amounts to just 30,000 pulses. This difference, however, is within the capacity range of the 16-bit comparator 4. Therefore, the microprocessor system 1 feeds a write signal $\overline{CSW}$ (chip select write) to the comparator 4 which causes the same to take-over the value of 30,000 pulses from the microprocessor or computer in the microprocessor system 1. Now when the counter 3 reaches the number of 30,000 pulses during the counting operation this event will be detected by the comparator 4 which consequently delivers the measurement triggering initiating signal EQ. This signal EQ causes measurement in another axis as explained above. Furthermore, the signal EQ is fed to the microprocessor system 1 to indicate to the same that the first stored restarting point $S_1$ has been processor or worked-off, so that now the second restarting point $S_2$ may be taken-over from the primary computer H and operated upon or processed.

As an additional feature it is provided that an external gating signal ESTR (extern strobe) having a fixed cycle is fed to the synchronizer circuit 6. Thus, a value proportional to the respective velocity of the sensor is contained in the buffer store 2, since at each start of the fixed cycle signal the counter always starts to count from null. In that case it only will be required to calculate the position in the microprocessor or computer of the microprocessor system or unit 1 after each fixed cycle pulse.

At each moment when the counter 3 is reset it must be ensured that there is no loss of any measuring pulse of the forwardly or backwardly directed measuring pulses. Therefore, the combined pulse storing and detecting means 5 is activated by the signal INH at the reset moment. The counter 3 is reset at a very high speed within a period of time which is approximately equal to the length of the period of the measuring pulses passing through the combined pulse storing and detecting means 5. The pulse-recognized signal IMP is supplied to the synchronizer circuit 6 by the combined pulse storing and detecting means 5 if, during the activation period of the combined pulse storing and detecting means 5, a measuring pulse has occurred. For enhanced understanding of the task and mode of operation of the combined pulse storing and detecting means 5 reference is now made to FIG. 3.

Figure 3:
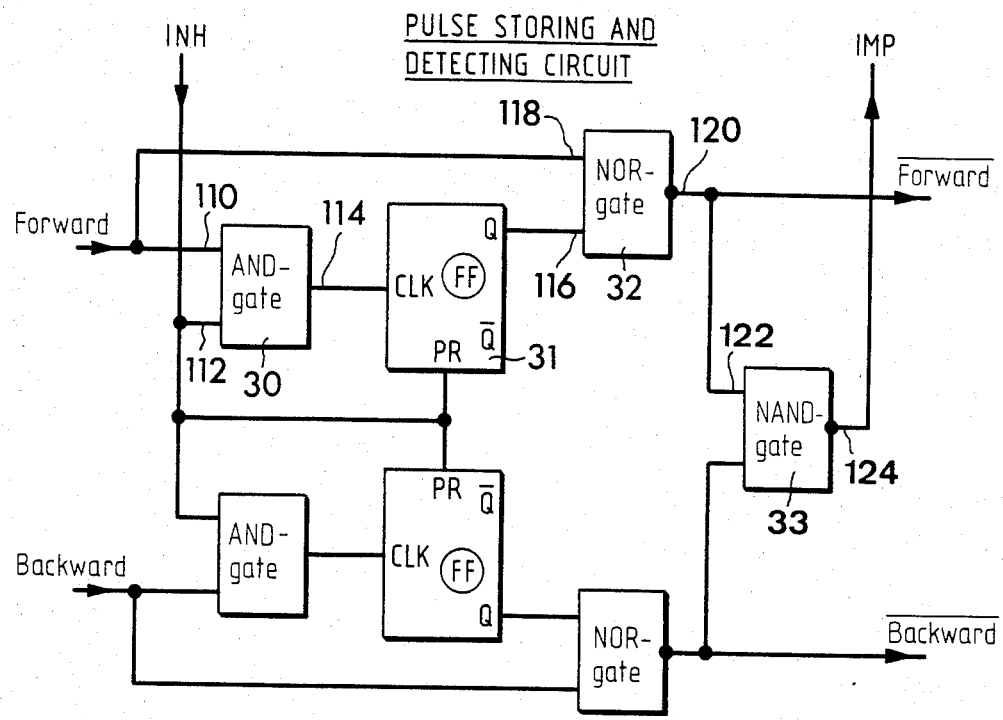
FIG. 3 is a block circuit diagram of a combined pulse storing and detecting means of the displacement detector shown in FIG. 2.
Figure 5:
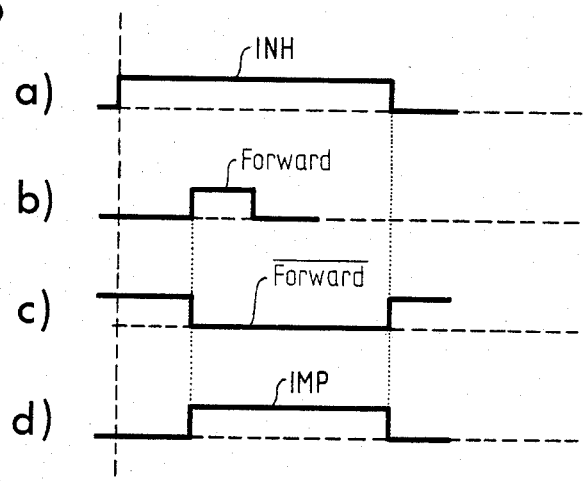
FIG. 5 is a pulse diagram explaining the mode of operation of the combined pulse storing and detecting means shown in FIG. 3.

The combined pulse storing and detecting means 5 includes two arrangements for the forwardly and backwardly directed measuring pulses which are in a mirror image relationship, so that only the upper half of the circuit shown in FIG. 3 will be described. There are provided in series connection an AND-gate or circuit 30, a flip-flop 31 and a NOR-gate or circuit 32 as well as a NAND-gate or circuit 33 which is common to the two halves of the combined pulse storing and detecting means 5. The input line FORWARD is connected to one input 110 of the AND-gate or circuit 30, to the other input 112 of which the blocking signal INH is applied. The output 114 of the AND-gate or circuit 30 is connected to the reset input CLK of the flip-flop 31, the output Q of which is connected to one input 116 of the NOR-gate or circuit 32, the other input 118 of which is directly connected to the input line FORWARD. The output 120 of the NOR-gate or circuit 32 is connected to the output line $\overline{FORWARD}$ of the combined pulse storing and detecting means 5 and to one input of the NAND-gate or circuit 33 the output 124 of which delivers the pulse-recognized signal IMP. When the combined pulse storing and detecting means 5 is to be activated the blocking signal INH assumes a signal value or logic state of 1, see FIG. 5a. If somewhat later a forwardly directed measuring pulse FORWARD appears at the input FORWARD (see FIG. 5b), the output signal $\overline{FORWARD}$ on the output line $\overline{FORWARD}$ will go to the signal value 0 at the leading or ascending edge of the measuring pulse FORWARD. The signal value 0 on the output line $\overline{FORWARD}$ will remain until the end of the blocking signal INH, because the flip-flop 31 will flip or toggle at the trailing or descending edge of the output signal of the NOR-gate or circuit 32. For this reason the signal state at the output 120 of the NOR-gate or circuit 32 is maintained until the flip-flop 31 flips or toggles back at the end of the blocking signal INH. However, at the moment when the signal at the output 120 of the NOR-gate or circuit 32 goes to the value of 0, the output signal of the NAND-gate or circuit 33, which is the pulse-recognized signal IMP, assumes the value 1, see FIG. 5d. In this way, the pulse which has arrived has been recognized.

Figure 4:
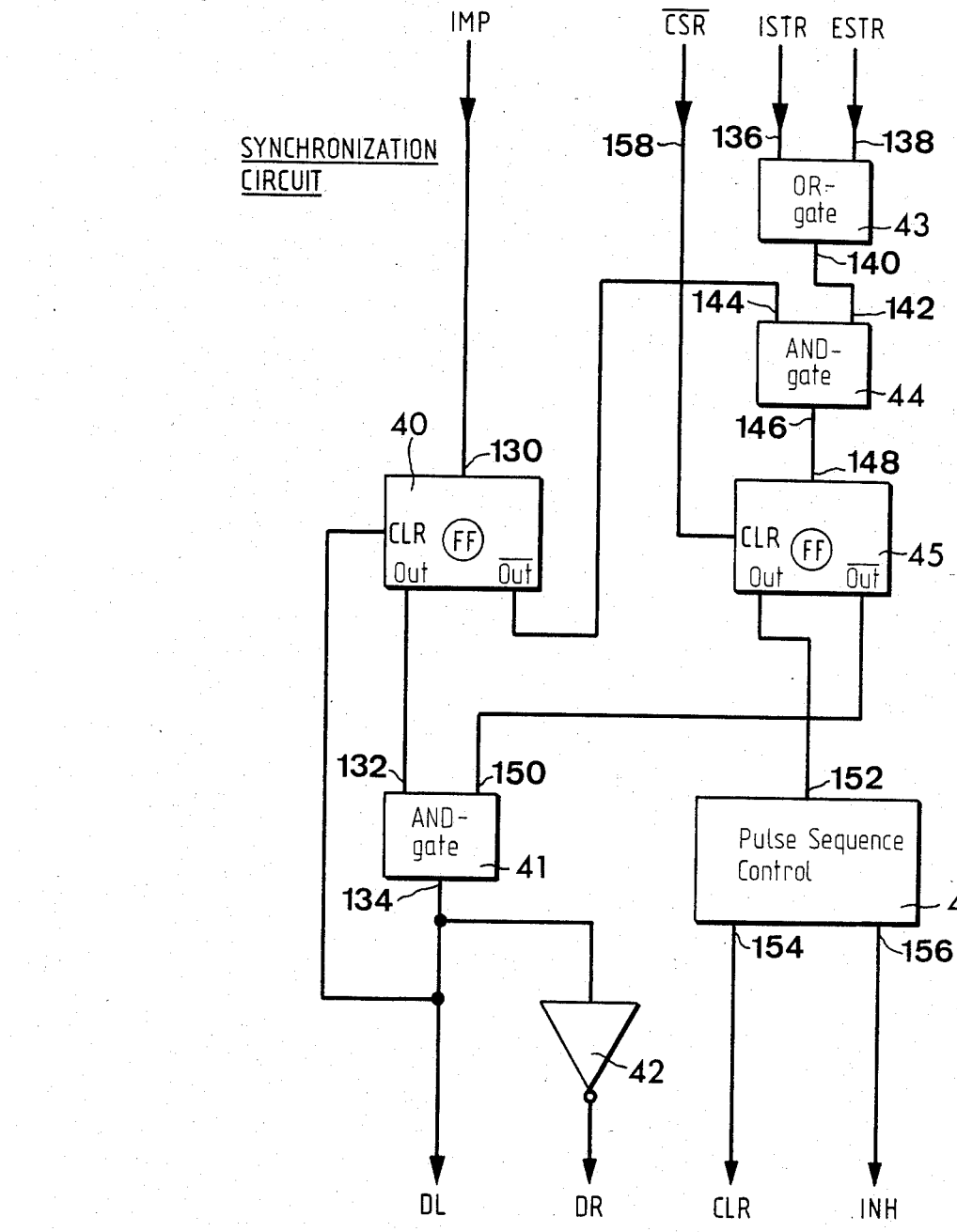
FIG. 4 is a block diagram of a synchronizer unit or circuit of the displacement detector shown in FIG. 2.

In FIG. 4 the synchronizer or synchronization circuit 6 is illustrated in greater detail. There is contained therein a flip-flop 40 forming a pulse event store, to the input 130 of which there is applied the pulse-recognized signal IMP. The output OUT of flip-flop 40 is connected to the input 132 of an AND-gate or circuit 41, the output 134 of which directly delivers the data-laden signal DL, the data-ready signal DR via an inverter 42 and, additionally, is connected to the clear or reset input CLR of the flip-flop 40. Through further inputs 136 and 138 the synchronizer circuit 6 receives the gating signals ISTR and ESTR, respectively, which are supplied to an OR-gate or circuit 43, the output 140 of which is connected to one input 142 of an AND-gate or circuit 44. The further input 144 of the AND-gate or circuit 44 is connected to the complimentary output $\overline{OUT}$ of the flip-flop 40 while the output 146 thereof is connected to the input 148 of a flip-flop 45 which serves as a storage means. The complimentary output $\overline{OUT}$ of the flip-flop 45 is connected to the other input 150 of the AND-gate or circuit 41. The output OUT of the flip-flop 45 is connected to the input 152 of a pulse sequence control circuit 46 which delivers the clear or reset signal CLR and the blocking signal INH at respective outputs 154 and 156 thereof. The reset input CLR of the flip-flop 45 receives the read signal $\overline{CSR}$ via a still further input 158 of the synchronizer circuit 6.

As already mentioned above, the pulse recognized in the pulse storing and detecting means 5 is reported via the pulse-recognized signal input IMP of the synchronizer circuit 6. Thereafter, the data is to be transferred. The condition therefor is that, when no externally generated gating signal ESTR has arrived, firstly the data must be read from the buffer or intermediate store 2 prior to continuation of the counting operation. The counter 3 is blocked by the AND-gate or circuit 41 and by the data-laden signal DL. When no gating signal has been present, the pulse-recognized signal IMP is transmitted unhindered via the output DL to the buffer store 2, the counter state is loaded and simultaneously, via the output DR, it is indicated that the data is again are ready. The gating signals ISTR and ESTR are transmitted through the OR-gate or circuit 43. To preclude measuring errors it must be ensured that no measuring pulse just arrives at the moment when a gating signal is transmitted. This decision is made by the AND-gate or circuit 44. When a measuring pulse arrives, the flip-flop 40 is set. In that case, the signal value at the output $\overline{\text{OUT}}$ becomes null and blocks the other input 144 of the AND-gate or circuit 44, so that no signal can pass therethrough. When no pulse event has occurred, the flip-flop 45 is set, which in the set state thereof blocks the data-laden signal DL via the output OUT thereof. The pulse sequence control circuit 46 always first generates the blocking signal INH and then the reset signal CLR, whereby some quiescent state is observed which protects against pulse loss.

The reason for the inverted signal values given hereinbefore and in the drawings is predicated upon the type or nature of the selected pulse control which, in the present case, is determined by a response to the leading or ascending pulse edge.

The following 16-bit circuit components are used, by way of example and not limitation, in the embodiment of the displacement detector described hereinbefore:

| Microprocessor system 1 | Intel 8086 |
| Buffer store 2 | AM 2920 |
| Comparator 4 | AM 2920, AM Z8121 |
| Up/Down Counter 3 | 25 LS 193 (Fabrimex) |

While there are shown and described present preferred embodiments of the invention, it is to be distinctly understood that the invention is not limited thereto, but may be otherwise variously embodied and practiced within the scope of the following claims. Accordingly,

What I claim is:

1. A displacement detecting system in a multi-axis measuring system containing measuring carriages respectively displaceable along a leading axis and at least one other axis in order to generate measuring pulses, especially for use with a gear wheel grinding or inspecting machine, comprising:

a primary computer containing stored therein predetermined restarting points located on the leading axis;

a number of channels corresponding in number to the number of said axes, each channel having a channel input;

each of said channels containing a displacement detector comprising:

a counter for counting a counted value corresponding to the displacement of an associated one of the measuring carriages;

said counter defining an overflow value and having an output;

a comparator having a predetermined bit capacity and an output for supplying a measurement initiating signal in order to detect a displacement position of at least one of said measuring carriages displaced along said at least one other axis when one of said restarting points is passed by the measuring carriage displaceable along the leading axis;

the output of said comparator being connected to the channel input of the channel associated with the measuring carriage displaceable along said at least one other axis;

a buffer store in which there is stored the counted value present in the counter at the moment when there occurs said measurement initiating signal;

a counter bus connecting said output of said counter to said comparator and to said buffer store;

a microprocessor system including control outputs;

said microprocessor system being connected to said comparator and to said buffer store;

a synchronizer circuit connected to said control outputs of said microprocessor system and provided with a plurality of synchronizer control outputs; and said plurality of synchronizer control outputs including three synchronizer control outputs respectively connected to said counter, to said buffer store, and to said microprocessor system, in order to block said counter each time prior to reaching said overflow value of the same, to transfer the contents of said buffer store containing the contents of said counter to said microprocessor system, to reset and to reactivate said counter until said counted value of said counter prior to reaching one of said restarting points does not amount to said overflow value of the counter and until said comparator, which has received from the microprocessor system the count remaining up to said restarting point and lying within said bit capacity of said comparator, delivers said measurement initiating signal when said remaining count conforms with a latest count counted by said counter.

2. The displacement detecting system as defined in claim 1, wherein the displacement detector thereof further includes:

pulse storing and detecting means arranged in circuit between said counter and said channel input and having a control output;

said pulse storing and detectng means being activatable by a fourth one of said control outputs of said synchronizer circuit at the moment when said counter is reset; and said control output of said pulse storing and detecting means being connected to said synchronizer circuit to activate the same each time one of said measuring pulses occurs.

3. The displacement detecting system as defined in claim 1, wherein:

said primary computer has at least one input;

said multi-axis measuring system comprising three axes;

three of said channels being provided, each one of said channels being operatively associated with a respective one of said three axes and each channel containing one of said displacement detectors;

said leading axis being selected from said three axes by said primary computer;

one of said displacement detectors associated with said leading axis having a measurement initiating signal output and each of the other of said displacement detectors have a gating signal input; and said measurement initiating signal output being connected to said gating signal inputs and to said at least one input of said primary computer.

* * * * *